US012566926B2

(12) United States Patent
Hsu et al.

(10) Patent No.: US 12,566,926 B2
(45) Date of Patent: Mar. 3, 2026

(54) SYSTEM AND METHOD FOR EFFICIENT LANGUAGE MODEL EDITING USING CONTEXTUAL PROMPT GENERATOR

(71) Applicant: Samsung Electronics Co., Ltd., Suwon-si (KR)

(72) Inventors: Yen-Chang Hsu, Fremont, CA (US); Harshavardhan Kamarthi, Atlanta, GA (US); Yilin Shen, Santa Clara, CA (US); Hongxia Jin, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 170 days.

(21) Appl. No.: 18/465,648

(22) Filed: Sep. 12, 2023

(65) Prior Publication Data

US 2024/0104309 A1     Mar. 28, 2024

Related U.S. Application Data

(60) Provisional application No. 63/410,558, filed on Sep. 27, 2022.

(51) Int. Cl.
| | |
|---|---|
| *G06F 40/35* | (2020.01) |
| *G06F 16/9032* | (2019.01) |
| *G06F 40/166* | (2020.01) |
| *G06F 40/216* | (2020.01) |
| *G06F 40/284* | (2020.01) |

(Continued)

(52) U.S. Cl.
CPC ........ *G06F 40/35* (2020.01); *G06F 16/90332* (2019.01); *G06F 40/166* (2020.01); *G06F 40/284* (2020.01); *G06F 40/30* (2020.01);

*G06F 40/40* (2020.01); *G06N 3/0455* (2023.01); *G06N 3/0499* (2023.01); *G06N 3/084* (2013.01);

(Continued)

(58) Field of Classification Search
None
See application file for complete search history.

(56) References Cited

U.S. PATENT DOCUMENTS

| | | | |
|---|---|---|---|
| 10,838,765 B2 | 11/2020 | Kim et al. | |
| 11,227,218 B2 | 1/2022 | Min et al. | |

(Continued)

OTHER PUBLICATIONS

Tianyi Tangm Junyi Li, Wayne Xin Zhao; Context-Tuning: Learning Contextualized Prompts for Natural Language Generation; Jan. 21, 2022; URL: https://arxiv.org/pdf/2201.08670v1 (Year: 2022).*

(Continued)

*Primary Examiner* — Richa Sonifrank

(57) ABSTRACT

A method includes receiving an input for a large language model (LLM) from a user. The method also includes generating one or more token embeddings based on the input. The method further includes generating one or more prompt embeddings based on the input using a contextual prompt generator (CPG), the one or more prompt embeddings representing new or updated information that is not contained in existing knowledge of the LLM. The method also includes providing the one or more token embeddings and the one or more prompt embeddings to the LLM. In addition, the method includes outputting a prediction based on the one or more token embeddings and the one or more prompt embeddings using the LLM, wherein the prediction reflects the new or updated information represented by the one or more prompt embeddings.

20 Claims, 8 Drawing Sheets

(51) Int. Cl.

| | |
|---|---|
| *G06F 40/30* | (2020.01) |
| *G06F 40/40* | (2020.01) |
| *G06N 3/0455* | (2023.01) |
| *G06N 3/0499* | (2023.01) |
| *G06N 3/084* | (2023.01) |
| *G06N 3/09* | (2023.01) |
| *G06N 20/00* | (2019.01) |
| *G06N 20/20* | (2019.01) |

(52) U.S. Cl.
CPC .............. *G06N 3/09* (2023.01); *G06N 20/00* (2019.01); *G06N 20/20* (2019.01); *G06F 40/216* (2020.01)

(56) References Cited

U.S. PATENT DOCUMENTS

| | | | | |
|---|---|---|---|---|
| 11,417,236 | B2 | 8/2022 | Marshall et al. | |
| 11,568,018 | B2* | 1/2023 | Baek | G06N 3/0464 |
| 11,765,207 | B1* | 9/2023 | McCarthy | G06F 40/186 |
| 12,340,191 | B1* | 6/2025 | Serban | G06N 3/08 |
| 2019/0303428 | A1 | 10/2019 | Munro et al. | |
| 2021/0150130 | A1 | 5/2021 | Munro et al. | |
| 2023/0112921 | A1* | 4/2023 | Cai | G06F 8/31 |
| | | | | 717/104 |
| 2023/0252224 | A1* | 8/2023 | Tran | G06F 40/56 |
| | | | | 715/256 |
| 2023/0342552 | A1* | 10/2023 | Bhardwaj | G06N 3/045 |
| 2023/0419027 | A1* | 12/2023 | Pang | G06N 3/045 |
| 2024/0012924 | A1* | 1/2024 | Kidd | G06F 40/216 |
| 2024/0104309 | A1* | 3/2024 | Hsu | G06F 40/166 |
| 2024/0256762 | A1* | 8/2024 | Beauchamp | G06F 40/166 |
| 2024/0370764 | A1* | 11/2024 | Goyal | G06N 3/045 |
| 2024/0403005 | A1* | 12/2024 | Friddle | G06F 8/35 |
| 2024/0412128 | A1* | 12/2024 | Rando | G06Q 30/018 |
| 2025/0053799 | A1* | 2/2025 | Rastogi | G06N 3/0475 |
| 2025/0103858 | A1* | 3/2025 | Chen | G06N 3/0455 |

OTHER PUBLICATIONS

Anton Sinitsin, Vsevolod Plokhotnyuk, Dmitriy Pyrkin, Sergei Popov, Artem Babenko; Editable Neural Networks; Jul. 22, 2022; URL: https://arxiv.org/pdf/2004.00345 (Year: 2022).*

Sinitsin et al., "Editable Neural Networks", International Conference on Learning Representations (ICLR) 2020, Jul. 2020, 12 pages.

Mitchell et al., "Fast Model Editing at Scale", International Conference on Learning Representations (ICLR) 2022, Jun. 2022, 21 pages.

Mitchell et al., "Memory-Based Model Editing at Scale", arXiv:2206.06520v1 [cs.AI], Jun. 2022, 15 pages.

International Search Report and Written Opinion of the International Searching Authority dated Jan. 17, 2024 in connection with International Patent Application No. PCT/KR2023/014823, 6 pages.

Tang et al., "Context-Tuning: Learning Contextualized Prompts for Natural Language Generation," Computation and Language (cs. CL), Version 1, Jan. 2022, 14 pages.

Supplementary European Search Report dated Oct. 14, 2025 in connection with European Patent Application No. 23873109.5, 7 pages.

Li et al., "Prefix-Tuning: Optimizing Continuous Prompts for Generation," Jan. 2021, 15 pages.

\* cited by examiner

SYSTEM AND METHOD FOR EFFICIENT LANGUAGE MODEL EDITING USING CONTEXTUAL PROMPT GENERATOR

CROSS-REFERENCE TO RELATED APPLICATION AND PRIORITY CLAIM

This application claims priority under 35 U.S.C. § 119(e) to U.S. Provisional Patent Application No. 63/410,558 filed on Sep. 27, 2022, which is hereby incorporated by reference in its entirety.

TECHNICAL FIELD

This disclosure relates generally to natural language processing. More specifically, this disclosure relates to a system and method for efficient language model editing using a contextual prompt generator.

BACKGROUND

Large language models (LLMs) are neural network models that take a piece of natural language as an input and generate one or more words as an output. An LLM can contain many parameters (such as billions of parameters) and can be trained with Internet-scale text data. The scale of the model and data can boost the LLM's capabilities and improve the output quality, enabling the commercial use of the LLM as a viable option. Industry has widely discussed and explored various use cases for LLM applications, such as chatbots for customer service, intelligent assistants for software tools, question-answering for knowledge inquiry, interfaces for interactive communication between humans and devices, and the like. In general, there is a high demand for LLM commercial deployment.

SUMMARY

This disclosure provides a system and method for efficient language model editing using a contextual prompt generator.

In a first embodiment, a method includes receiving an input for a large language model (LLM) from a user. The method also includes generating one or more token embeddings based on the input. The method further includes generating one or more prompt embeddings based on the input using a contextual prompt generator (CPG), w % here the one or more prompt embeddings represent new or updated information that is not contained in existing knowledge of the LLM. The method also includes providing the one or more token embeddings and the one or more prompt embeddings to the LLM. In addition, the method includes outputting a prediction based on the one or more token embeddings and the one or more prompt embeddings using the LLM, where the prediction reflects the new or updated information represented by the one or more prompt embeddings.

In a second embodiment, an electronic device includes at least one processing device configured to receive an input for an LLM from a user. The at least one processing device is also configured to generate one or more token embeddings based on the input. The at least one processing device is further configured to generate one or more prompt embeddings based on the input using a CPG, w % here the one or more prompt embeddings represent new or updated information that is not contained in existing knowledge of the LLM. The at least one processing device is also configured to provide the one or more token embeddings and the one or more prompt embeddings to the LLM. In addition, the at least one processing device is configured to output a prediction based on the one or more token embeddings and the one or more prompt embeddings using the LLM, where the prediction reflects the new or updated information represented by the one or more prompt embeddings.

In a third embodiment, a non-transitory machine-readable medium contains instructions that when executed cause at least one processor of an electronic device to receive an input for an LLM from a user. The non-transitory machine-readable medium also contains instructions that when executed cause the at least one processor to generate one or more token embeddings based on the input. The non-transitory machine-readable medium further contains instructions that when executed cause the at least one processor to generate one or more prompt embeddings based on the input using a CPG, where the one or more prompt embeddings represent new or updated information that is not contained in existing knowledge of the LLM. The non-transitory machine-readable medium also contains instructions that when executed cause the at least one processor to provide the one or more token embeddings and the one or more prompt embeddings to the LLM. In addition, the non-transitory machine-readable medium contains instructions that when executed cause the at least one processor to output a prediction based on the one or more token embeddings and the one or more prompt embeddings using the LLM, where the prediction reflects the new or updated information represented by the one or more prompt embeddings.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media w % here data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B." or "one or more of A and/or B" may include all possible combinations of A and B. For example, "A or B," "at least one of A and B." and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B. and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a." "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOME-POD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus." "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
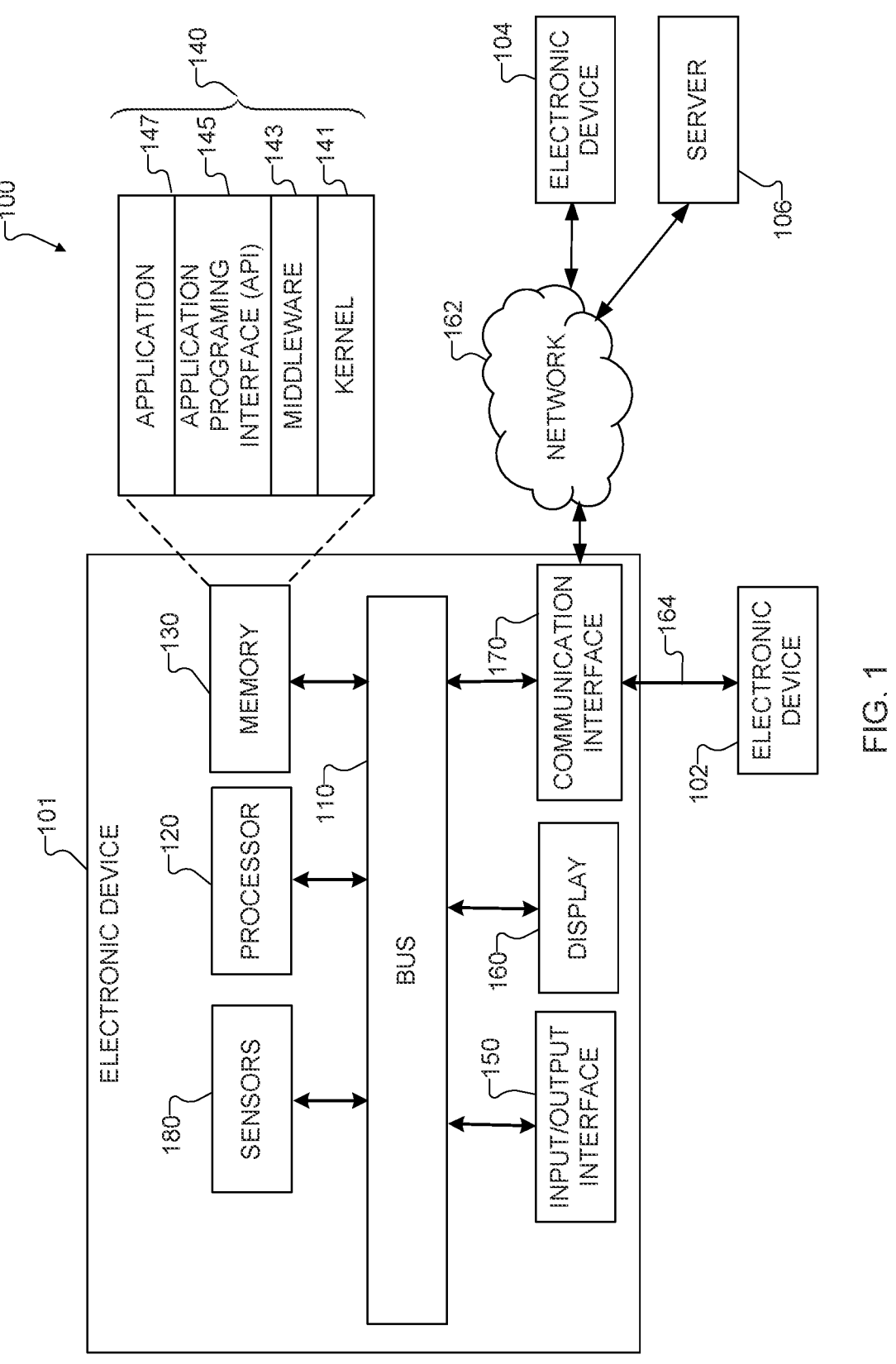
FIG. 1 illustrates an example network configuration including an electronic device according to this disclosure.

FIGS. 1 through 9, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As discussed above, large language models (LLMs) are neural network models that take a piece of natural language as an input and generate one or more words as an output. An LLM can contain many parameters (such as billions of parameters) and can be trained with Internet-scale text data. The scale of the model and data can boost the LLM's capabilities and improve the output quality, enabling the commercial use of the LLM as a viable option. Industry has widely discussed and explored various use cases for LLM applications, such as chatbots for customer service, intelligent assistants for software tools, question-answering for knowledge inquiry, interfaces for interactive communication between humans and devices, and the like. In general, there is a high demand for LLM commercial deployment.

The commercial use of LLMs still faces several challenges, including those related to model maintenance, safety guarantee, and quality control. For example, ongoing model maintenance can be needed since certain facts about the world change over time. Thus, there is a need to maintain an LLM with up-to-date facts. As a particular example, when users ask about the name of the current U.S. president, the model should reply "Donald Trump" if asked in 2020 and "Joe Biden" if asked in 2023. Some safety guarantees mean that the output of an LLM should not cause any hazards in the physical world. As a particular example, a user may ask about instructions for using a cooking appliance, and the LLM should not instruct users to wrap food with tin foil when using a microwave oven (which is a fire hazard) even when the same practice works well with a traditional oven.

With respect to quality control, before releasing an LLM to market, the LLM usually goes through comprehensive tests by a quality assurance department to identify the wrong outputs of a targeted commercial use case. These errors should be corrected in a controllable way in order to minimize the probability of errors reoccurring. This error correction process is not trivial since the LLM is a complicated probabilistic model, which may give different responses with slightly different language inputs.

The use of model editing can address some of these challenges. However, current model editing strategies have drawbacks in several ways, making them non-applicable for real-world deployments. For example, some current techniques have their precisions drop quickly after updating with a handful of editing data. That is, the outputs for many unrelated inputs are often changed to wrong outputs. Also, some current techniques do not predict correct outputs with entailed inputs. In addition, some current techniques introduce significant overhead in training and inferencing. As a result, training LLMs can be exceptionally costly, such as millions of dollars per model.

This disclosure provides various techniques for performing efficient language model editing using a contextual prompt generator. As described in more detail below, the disclosed systems and methods provide efficient and controllable model editing, enabling LLM editing at scale, with lower costs and improved precisions. Note that while some of the embodiments discussed below are described in the context of use in consumer electronic devices (such as smartphones), this is merely one example, and it will be understood that the principles of this disclosure may be implemented in any number of other suitable contexts and may use any suitable devices.

FIG. 1 illustrates an example network configuration 100 including an electronic device according to this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described in more detail below, the processor 120 may perform one or more operations for efficient language model editing using a contextual prompt generator.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may support one or more functions for efficient language model editing using a contextual prompt generator as discussed below. These functions can be performed by a single application or by multiple applications that each carry out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors for capturing images of scenes. The sensor(s) 180 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the electronic device 101 can be a wearable device or an electronic device-mountable wearable device (such as an HMD). For example, the electronic device 101 may represent an AR wearable device, such as a headset with a display panel or smart eyeglasses. In other embodiments, the first external electronic device 102 or the second external electronic device 104 can be a wearable device or an electronic device-mountable wearable device (such as an HMD). In those other embodiments, when the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving a separate network.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described in more detail below, the server 106 may perform one or more operations to support techniques for efficient language model editing using a contextual prompt generator.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
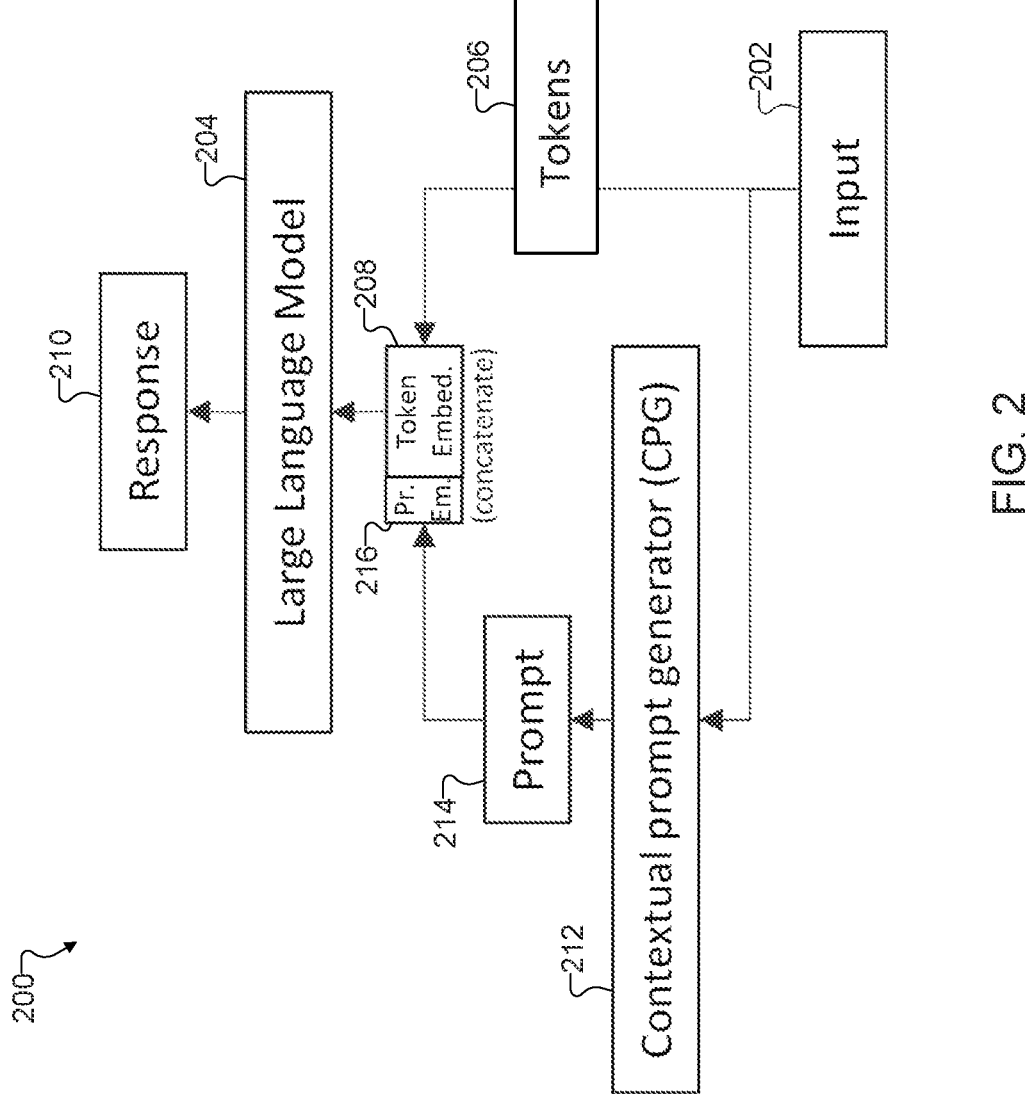
FIG. 2 illustrates an example system for efficient language model editing using a contextual prompt generator (CPG) according to this disclosure.

FIG. 2 illustrates an example system 200 for efficient language model editing using a contextual prompt generator according to this disclosure. For ease of explanation, the system 200 is described as being implemented using one or more components of the network configuration 100 of FIG. 1 described above, such as the electronic device 101. However, this is merely one example, and the system 200 could be implemented using any other suitable device(s) (such as the server 106) and in any other suitable system(s).

As shown in FIG. 2, using the system 200, the electronic device 101 receives an input 202 for a large language model (LLM) 204. In some embodiments, the input 202 is a textual input provided to the electronic device 101 by a user, such as by speaking into a microphone of the electronic device

101, typing on a touchscreen of the electronic device 101, or using any other suitable input mechanism. As a particular example, in some cases, the input 202 represents a question that is to be answered by the LLM 204.

The LLM 204 can represent a large pre-trained language model. In some embodiments, the LLM 204 includes an encoder-decoder or a decoder-only architecture. Before providing the input 202 to the LLM 204, the electronic device 101 generates tokens 206 from the input 202 and generates one or more token embeddings 208 from the tokens 206. The token embeddings 208 are feature vectors, each of which represents a portion of the input 202. The electronic device 101 provides the token embeddings 208 as input to the LLM 204, which generates a response 210 (such as a prediction) associated with the input 202.

In some embodiments, the input 202 is a question whose answer can change over time. For example, the input 202 could be "Who is the current U.S. president?" If the question is asked in 2020, the correct answer is "Donald Trump." If the question is asked in 2023, the correct answer is "Joe Biden." In some cases, the pre-trained LLM 204 is static, meaning the LLM 204 includes an existing knowledge base that does not change over time. In particular, the weights of an encoder and a decoder of the LLM 204 do not change over time. In such a case, the LLM 204 could generate a correct response 210 to the input 202 "Who is the current U.S. president?" in one year but provide an incorrect response 210 in a different year (once the U.S. president has changed).

To address this issue, the system 200 also includes a contextual prompt generator (CPG) 212. The CPG 212 receives the input 202 and generates a prompt 214 from the input 202. The prompt 214 is a single token that represents new or updated information that is not contained in the existing knowledge of the LLM 204. Using the above example of "Who is the current U.S. president?", the prompt 214 represents updated information about the current U.S. president. After the CPG 212 generates the prompt 214 based on the input 202, the CPG 212 generates at least one prompt embedding 216. Similar to the token embeddings 208, the prompt embedding 216 is a feature vector representing the prompt 214, thereby representing the new or updated information that is not contained in the existing knowledge of the LLM 204. The prompt embedding 216 may have the same number of dimensions as the token embeddings 208 (such as 1,024 dimensions per token). The prompt embedding 216 and the token embeddings 208 typically represent real-valued vectors. An example of such a vector could be [0.23, 0.15, −0.87, . . . , 1.1].

In some embodiments, the CPG 212 includes a neural network having one or more transformers, which are standard blocks used to build a neural network. As described in greater detail below, the CPG 212 generates the prompt embedding 216 from a set of edit embeddings representing edit descriptors, where the edit descriptors include the new or updated information. The CPG 212 is trained to generate the prompt embedding 216 based on the edit descriptors and the input 202. While the following description discusses a single prompt 214 and a single prompt embedding 216, it will be understood that the CPG 212 could generate multiple prompts 214 and multiple prompt embeddings 216.

After the CPG 212 generates the prompt embedding 216, the electronic device 101 concatenates the prompt embedding 216 and the token embeddings 208. For example, the electronic device 101 can concatenate the prompt embedding 216 at the beginning of the token embeddings 208 as a prefix. As another example, the electronic device 101 can concatenate the prompt embedding 216 at the end of the token embeddings 208 as a suffix. The combination of the prompt embedding 216 and the token embeddings 208 is provided as input to the LLM 204. The added prompt embedding 216 affects the inference of the LLM 204 and causes the LLM 204 to generate an updated (ideally correct) response 210, thus achieving the effect of model editing. Stated differently, the prompt embedding 216 provides information on the parts of the edit descriptors relevant to the input 202 so that the LLM 204 can provide the updated response 210. Here, the updated response 210 reflects the new or updated information represented by the prompt embedding 216 but not present in the existing knowledge of the LLM 204.

Although FIG. 2 illustrates one example of a system 200 for efficient language model editing using a contextual prompt generator and related details, various changes may be made to FIG. 2. For example, w % bile the CPG 212 and the LLM 204 are described as involving specific sequences of operations, various operations described with respect to FIG. 2 could overlap, occur in parallel, occur in a different order, or occur any number of times (including zero times). Also, the specific operations shown in FIG. 2 are examples only, and other techniques could be used to perform each of the operations shown in FIG. 2.

Figure 3:
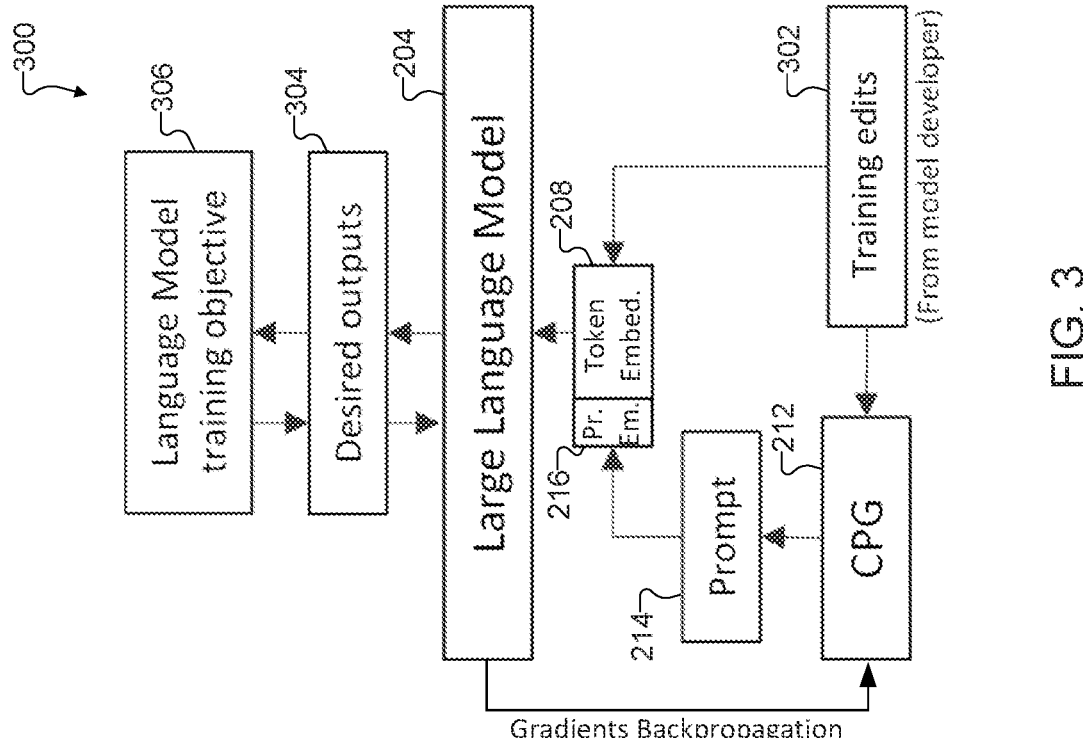
FIG. 3 illustrates an example process for training the CPG used in the system of FIG. 2 according to this disclosure.

FIG. 3 illustrates an example training process 300 for training the CPG 212 according to this disclosure. The training process 300 can be performed before deployment of the system 200 to an end product (such as the electronic device 101). For ease of explanation, the training process 300 is described as being implemented using one or more components of the network configuration 100 of FIG. 1 other than the electronic device 101, such as the server 106. However, this is merely one example, and the training process 300 could be implemented using any other suitable device(s) (such as the electronic device 101) and in any other suitable system(s). It is also possible for the same device (such as the server 106) to train and use the CPG 212.

As shown in FIG. 3, the CPG 212 is trained with a set of training edit embeddings 302, which can be prepared in any suitable manner. In some cases, the set of training edit embeddings 302 is prepared by a model developer. The training edit embeddings 302 represent example edit descriptors that can include new or updated information not contained in the existing knowledge of the LLM 204. The training edit embeddings 302 are provided as inputs to the LLM 204 and the CPG 212.

The LLM 204 operates on the training edit embeddings 302 to generate one or more outputs 304, which represent responses to the training edit embeddings 302. The outputs 304 are compared to a language model training objective 306, and one or more losses are calculated. The one or more losses represent the difference(s) between the outputs 304 and the training objective 306. Here, the training objective 306 and each of the calculated losses respectively represent any suitable training objective and calculated loss for use in training an LLM. In some cases, each calculated loss is converted into a gradient, which is backpropagated to the CPG 212. Based on the gradient, one or more parameters (such as weighting parameters) are updated in the CPG 212. Note here that only the parameters in CPG 212 may be updated, while the parameters of the LLM 204 can remain static.

Although FIG. 3 illustrates one example of a training process 300 for training the CPG 212, various changes may be made to FIG. 3. For example, while the training process 300 is described as involving specific sequences of operations, various operations described with respect to FIG. 3 could overlap, occur in parallel, occur in a different order, or occur any number of times (including zero times). Also, while the training process 300 is described above as being performed by the server 106, all or portions of the training process 300 can be implemented by another device.

Figure 4:
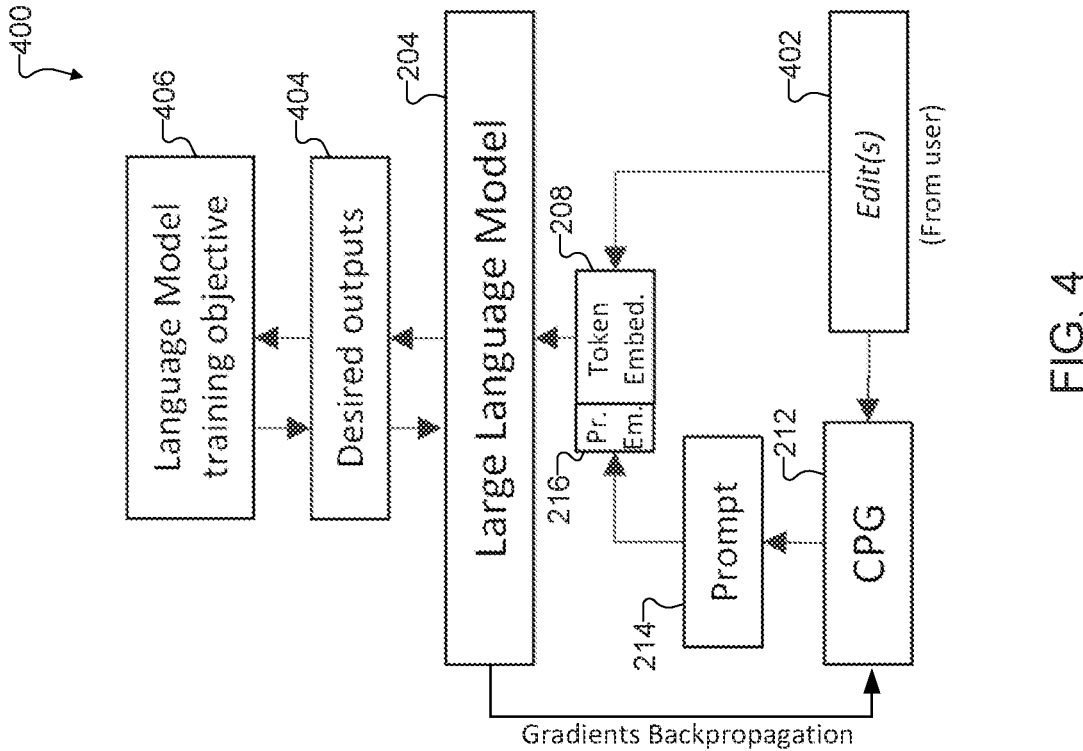
FIG. 4 illustrates an example process for editing the CPG used in the system of FIG. 2 according to this disclosure.

FIG. 4 illustrates an example editing process 400 for editing the CPG 212 according to this disclosure. In contrast to the training process 300 (which can be performed before deployment), the editing process 400 can be performed at various times, including after deployment of the system 200 to an end product. Depending on the embodiment, the editing process 400 can be implemented using one or more components of the network configuration 100 of FIG. 1, such as the electronic device 101 or a device other than the electronic device 101 (like the server 106). However, this is merely one example, and the editing process 400 could be implemented using any other suitable device(s) and in any other suitable system(s).

As shown in FIG. 4, the CPG 212 is edited using one or more editing inputs 402 provided by a user of the end product. Each of the editing inputs 402 represents at least one edit descriptor that can include new or updated information not contained in the existing knowledge of the LLM 204. The editing inputs 402 are tokenized and encoded into embeddings, which are provided as inputs to the LLM 204 and the CPG 212.

The LLM 204 operates on the editing inputs 402 to generate one or more outputs 404, which represent responses to the editing inputs 402. The outputs 404 are compared to a language model training objective 406 (which can be the same as or similar to the language model training objective 306), and one or more losses are calculated. The one or more losses represent the difference(s) between the outputs 404 and the training objective 406. Here, the training objective 406 and each of the calculated losses respectively represent any suitable training objective and calculated loss for use in training an LLM. In some cases, each calculated loss is converted into a gradient, which is backpropagated to the CPG 212. Based on the gradient, one or more parameters (such as weighting parameters) are updated in the encoder of the CPG 212. Again, note here that only the parameters in CPG 212 may be updated, while the parameters of the LLM 204 can remain static.

Although FIG. 4 illustrates one example of an editing process 400 for editing the CPG 212, various changes may be made to FIG. 4. For example, while the editing process 400 is described as involving specific sequences of operations, various operations described with respect to FIG. 4 could overlap, occur in parallel, occur in a different order, or occur any number of times (including zero times). Also, while the editing process 400 is described above as being performed by the server 106 or the electronic device 101, all or portions of the editing process 400 can be implemented by another device.

Figure 5:
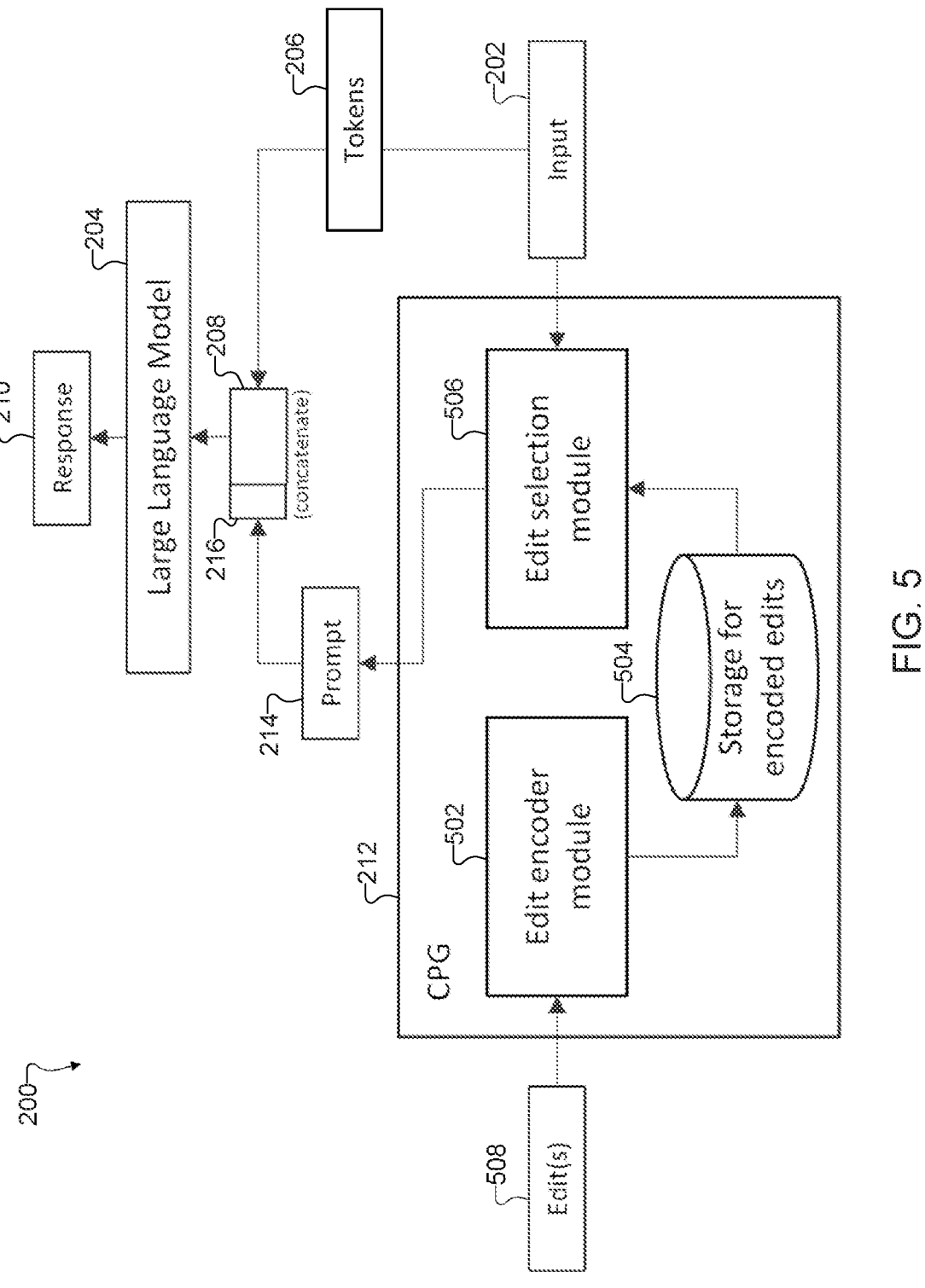
FIG. 5 illustrates additional details of one example of the CPG used in the system of FIG. 2 according to embodiments of this disclosure.

FIG. 5 illustrates additional details of one example of the CPG 212 according to this disclosure. In this example, the CPG 212 does not require any model training during an editing process, such as shown in FIG. 4. As shown in FIG. 5, the CPG 212 includes an edit encoder module 502, a storage 504 for encoded edits, and an edit selection module 506. The edit encoder module 502 receives one or more edits 508, such as from a user or model developer, and encodes the edits 508. The storage 504 is used by the CPG 212 to store the outputs of the edit encoder module 502. In some embodiments, the storage 504 represents a standard file system in a volatile and/or non-volatile memory, such as the memory 130. Depending on the embodiment, the storage 504 may be on-device, in the cloud, or in any other suitable location(s). The edit selection module 506 compares the inputs 202 and the encoded edits 508 to generate the prompt 214.

Figure 6:
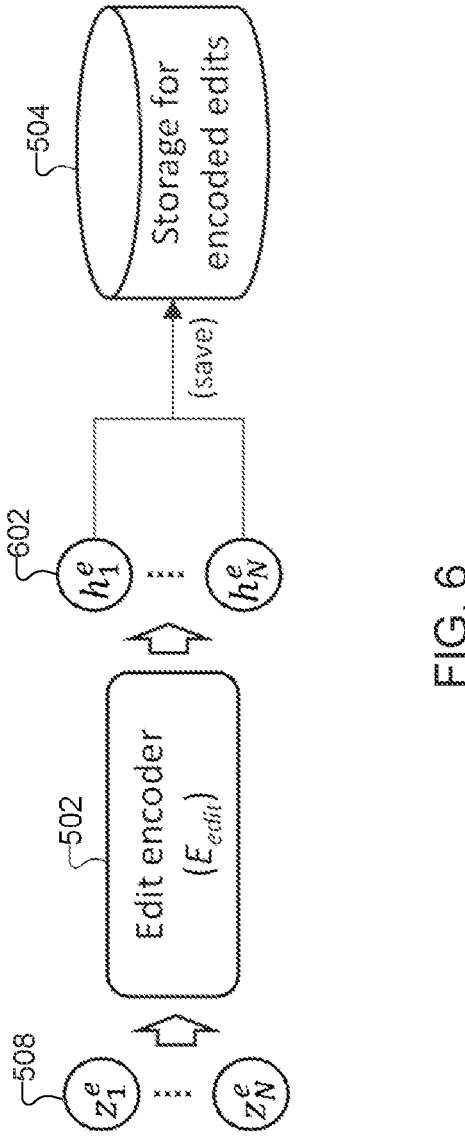
FIG. 6 illustrates additional details of one example of an edit encoder module that is part of the CPG of FIG. 5 according to this disclosure.

FIG. 6 illustrates additional details of one example of the edit encoder module 502 according to this disclosure. In this example, the edit encoder module 502 represents a trainable neural network module that includes multiple layers of transformer blocks. As shown in FIG. 6, the edit encoder module 502 receives edits 508 (identified in FIG. 6 as $Z_1^e, \ldots, Z_N^e$). Each edit 508 includes an edit descriptor, such as text that describes the edit 508. The edit descriptors can be obtained from any suitable source(s), such a model developer or one or more users. In some embodiments, each edit descriptor is formatted as a sentence or as a question and answer, w % here the answer corresponds to the question. As a particular example, the answer of each question can be different than a corresponding answer in the existing knowledge of the LLM 204 for the same question. For example, one edit 508 could include the text "Who is the current president of USA? Joe Biden." Another edit 508 could include the text "When is tax day? Oct. 16, 2023."

The edits 508 are provided as inputs to the edit encoder module 502, which encodes the edits 508 to generate corresponding edit embeddings 602 (identified in FIG. 6 as $h_1^e, \ldots, h_N^e$). The edit embeddings 602 can represent real-valued vectors that are stored in the storage 504. One representative example of an edit embedding 602 could be the vector [0.3, 0.9, −2.1, 0, . . . , −0.5]. However, each vector could have any suitable values and dimensions. As indicated above, the storage 504 can include a standard file system on a server, in the cloud, or on a user device.

Figure 7:
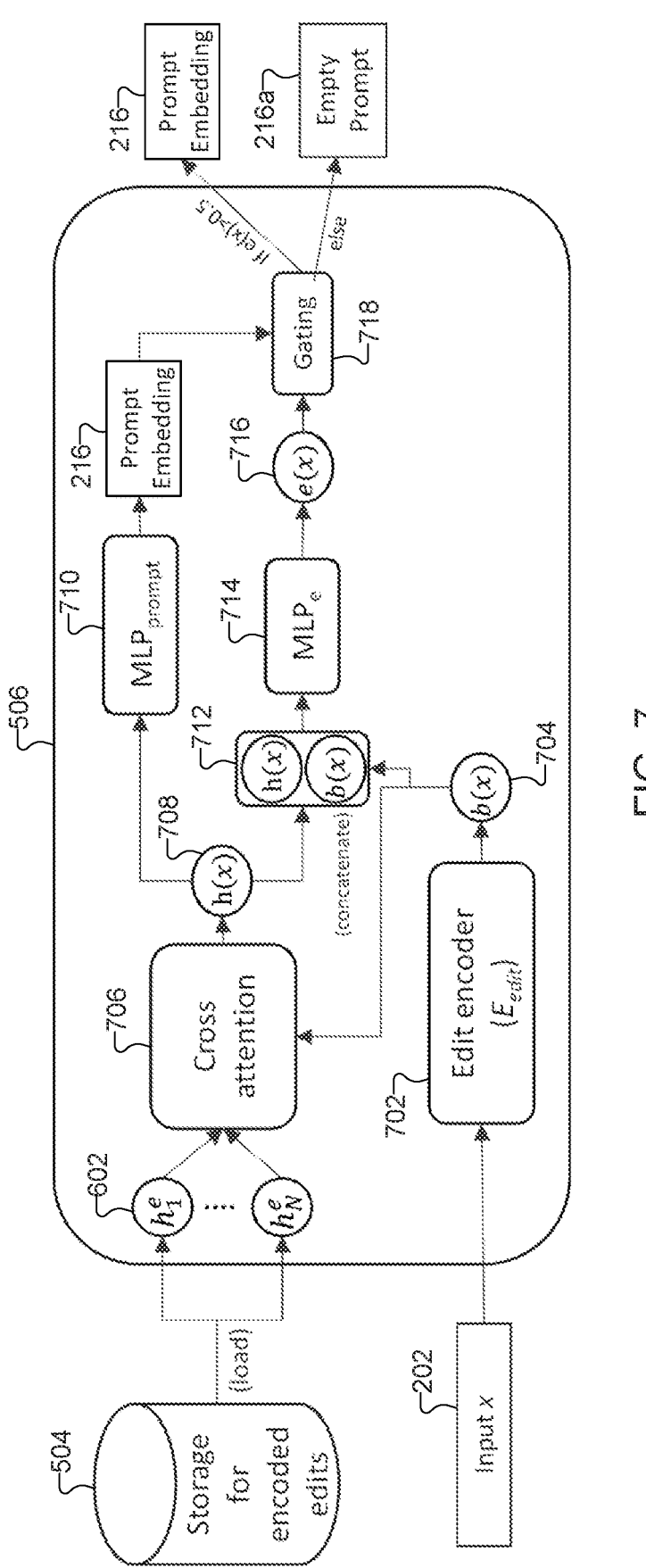
FIG. 7 illustrates additional details of one example of an edit selection module that is part of the CPG of FIG. 5 according to this disclosure.

FIG. 7 illustrates additional details of one example of the edit selection module 506 according to this disclosure. As shown in FIG. 7, the edit selection module 506 obtains a set of edit embeddings 602 from the storage 504. In some embodiments, the edit selection module 506 loads all or a subset of the saved edit embeddings 602 from the storage 504 into a temporary memory location. The edit selection module 506 also obtains the input 202 from the user.

The edit selection module 506 includes an edit encoder 702 that encodes the input 202 to generate an intermediate input embedding 704. In some embodiments, the edit encoder 702 may represent the edit encoder module 502, although this need not be the case. The edit encoder 702 can represent any suitable language model encoder, such as BERT or a base encoder of the LLM 204. The generated intermediate input embedding 704 can represent a real-valued vector with the same number of dimensions as the edit embeddings 602. One representative example of an intermediate input embedding 704 could be the vector [−0.3, −0.1, 0.2, 0.5, . . . , 0]).

The edit selection module 506 also includes a cross attention layer 706 that receives the set of edit embeddings 602 and the intermediate input embedding 704 and outputs an intermediate edit embedding 708. For example, the cross attention layer 706 may generate the intermediate edit embedding 708 by comparing the similarity between intermediate input embedding 704 and each of the edit embeddings 602. The cross attention layer 706 can select the edit embedding 602 that is most similar to the intermediate input embedding 704 and output that selected edit embedding 602 as the intermediate edit embedding 708. In some cases, the cross attention layer 706 represents a trainable neural network layer and can have any suitable architecture, such as the same or similar architecture as a cross attention layer in a standard transformer layer. Once the intermediate edit embedding 708 is determined using the cross attention layer 706, the edit selection module 506 applies a multilayer perceptron (MLP) layer 710 to the intermediate edit embedding 708 to generate the prompt embedding 216. In some cases, the MLP layer 710 represents a small trainable neural network with one or more linear layers.

Because the intermediate edit embedding 708 (and the corresponding prompt embedding 216) can be in scope or out of scope (such as relevant or not relevant) to the input 202, the edit selection module 506 also determines a likelihood that the intermediate input embedding 708 is relevant to the input 202. For example, the edit selection module 506 may concatenate the intermediate input embedding 704 and the intermediate edit embedding 708 using a concatenation operation 712 and apply another MLP layer 714 to the concatenated result in order to generate a confidence value 716. In some cases, the MLP layer 714 represents a small trainable neural network with one or more linear layers. The confidence value 716 can represent a real value (such as 0.2 or 0.87) that represents the likelihood that the intermediate edit embedding 708 and the corresponding prompt embedding 216 are relevant to the input 202.

The edit selection module 506 performs a gating operation 718 that compares the confidence value 716 to a specified threshold value (such as 0.5) that represents a minimum likelihood confidence for proceeding. If the confidence value 716 is greater than or equal to the threshold, the edit selection module 506 outputs the prompt embedding 216. Otherwise, the edit selection module 506 is not confident in the prompt embedding 216 and can output an empty prompt embedding 216a. The empty prompt embedding 216a allows the LLM 204 to generate a response 210 without interference from the CPG 212.

Although FIGS. 5 through 7 illustrate one example of the CPG 212 and related details, various changes may be made to FIGS. 5 through 7. For example, while the edit encoder module 502 and the edit selection module 506 are described as involving specific sequences of operations, various operations described with respect to FIGS. 5 through 7 could overlap, occur in parallel, occur in a different order, or occur any number of times (including zero times). Also, the specific operations shown in FIGS. 5 through 7 are examples only, and other techniques could be used to perform each of the operations shown in FIGS. 5 through 7.

Figure 8:
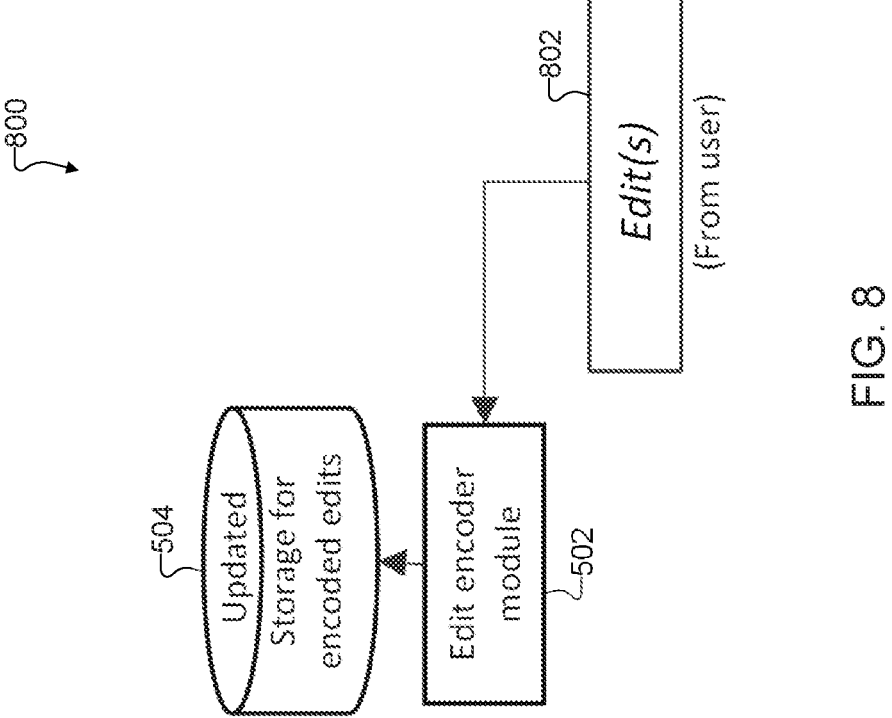
FIG. 8 illustrates another example process for editing the CPG used in the system of FIG. 2 according to this disclosure.

FIG. 8 illustrates another example process 800 for editing the CPG 212 used in the system 200 of FIG. 2 according to this disclosure. The editing process 800 can be implemented using one or more components of the network configuration 100 of FIG. 1, such as the electronic device 101. However, this is merely one example, and the editing process 800 could be implemented using any other suitable device(s) (such as the server 106) and in any other suitable system(s).

As shown in FIG. 8, the CPG 212 is edited by receiving one or more editing inputs 802, which may be obtained from any suitable source(s) (such as a user). The editing inputs 802 can represent one or more edit descriptors that include new or updated information not contained in the existing knowledge of the LLM 204. The edit encoder module 502 receives the editing inputs 802 and encodes the editing inputs 802 into edit embeddings, which are stored as an updated set of edit embeddings in the storage 504. In contrast to the editing process 400, the editing process 800 does not involve model training, which can make the editing process 800 fast and computationally efficient and thus suitable for operation on a user device, such as a smartphone or tablet.

Although FIG. 8 illustrates another example of a process 800 for editing the CPG 212 used in the system 200 of FIG. 2, various changes may be made to FIG. 8. For example, while the editing process 800 is described as involving specific sequences of operations, various operations described with respect to FIG. 8 could overlap, occur in parallel, occur in a different order, or occur any number of times (including zero times). Also, while the editing process 800 is described above as being performed by the electronic device 101, all or portions of the editing process 400 can be implemented by another device (such as the server 106).

It should be noted that the functions shown in FIGS. 2 through 8 or described above can be implemented in an electronic device 101, 102, 104, server 106, or other device(s) in any suitable manner. For example, in some embodiments, at least some of the functions shown in FIGS. 2 through 8 or described above can be implemented or supported using one or more software applications or other software instructions that are executed by the processor 120 of the electronic device 101, 102, 104, server 106, or other device(s). In other embodiments, at least some of the functions shown in FIGS. 2 through 8 or described above can be implemented or supported using dedicated hardware components. In general, the functions shown in FIGS. 2 through 8 or described above can be performed using any suitable hardware or any suitable combination of hardware and software/firmware instructions. Also, the functions shown in FIGS. 2 through 8 or described above can be performed by a single device or by multiple devices. For instance, the server 106 might be used to train one or more components, and the server 106 could deploy the one or more trained components to one or more other devices (such as the electronic device 101) for use.

Figure 9:
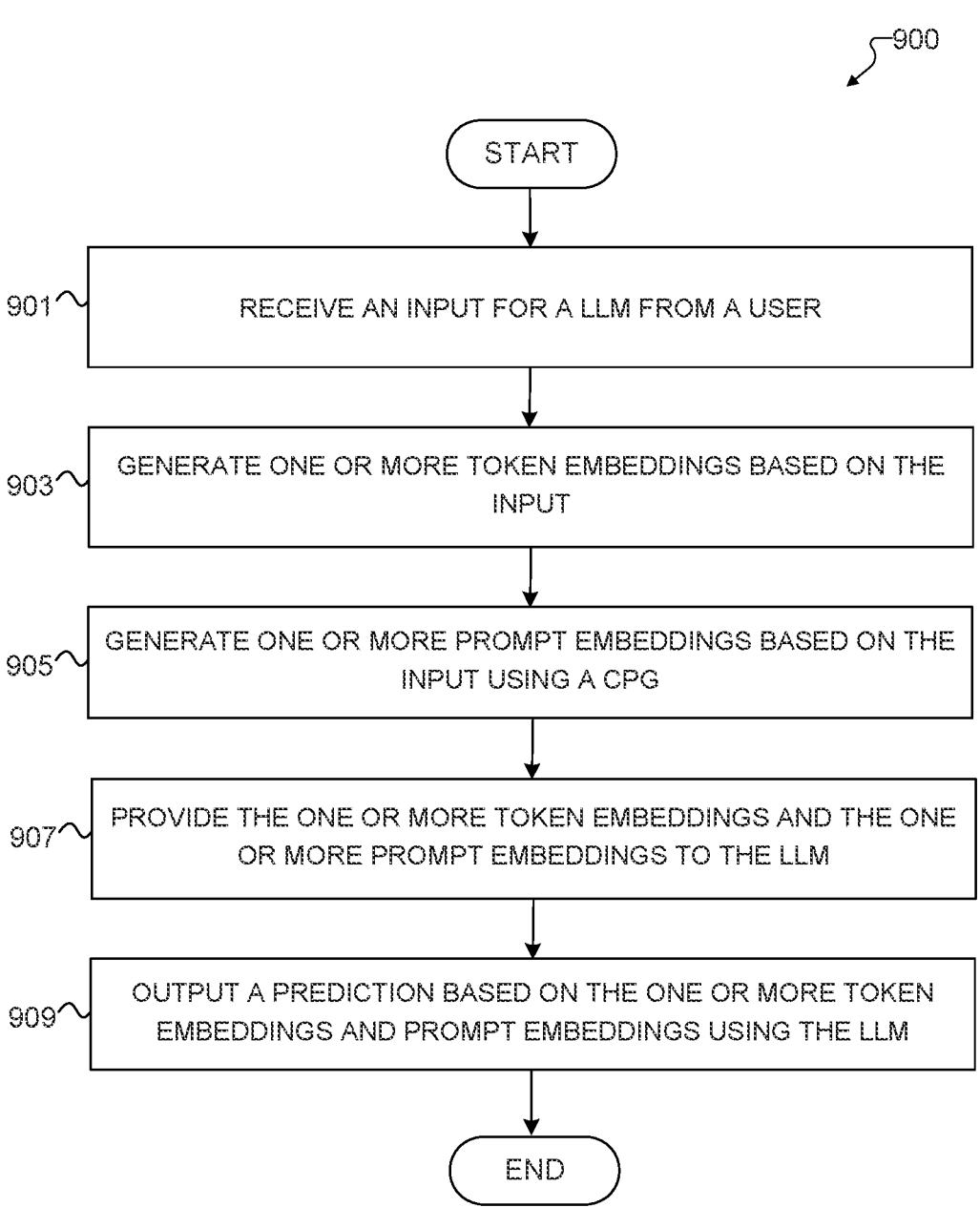
FIG. 9 illustrates an example method for efficient language model editing using a contextual prompt generator according to this disclosure.

FIG. 9 illustrates an example method 900 for efficient language model editing using a contextual prompt generator according to this disclosure. For ease of explanation, the method 900 shown in FIG. 9 is described as being performed using the electronic device 101 shown in FIG. 1 using the system 200 shown in FIG. 2. However, the method 900 shown in FIG. 9 could be used with any other suitable device(s) or system(s).

As shown in FIG. 9, at step 901, an input for an LLM is received from a user. This could include, for example, the electronic device 101 receiving an input 202 for the LLM 204 from a user. At step 903, one or more token embeddings are generated based on the input. This could include, for example, the electronic device 101 generating one or more token embeddings 208 based on the input 202. At step 905, one or more prompt embeddings are generated based on the input using a CPG. This could include, for example, the electronic device 101 generating one or more prompt embeddings 216 based on the input 202 using the CPG 212. The one or more prompt embeddings 216 represent new or updated information that is not contained in existing knowledge of the LLM 204.

At step 907, the one or more token embeddings and the one or more prompt embeddings are provided to the LLM. This could include, for example, the electronic device 101 providing the one or more token embeddings 208 and the one or more prompt embeddings 216 as input to the LLM 204. In some cases, the one or more token embeddings 208 and the one or more prompt embeddings 216 can be concatenated. At step 909, a prediction is output based on the one or more token embeddings and the one or more prompt embeddings using the LLM. This could include, for example, the electronic device 101 using the LLM 204 to output a predicted response 210 based on the one or more token embeddings 208 and the one or more prompt embeddings 216. The prediction reflects the new or updated information represented by the one or more prompt embeddings 216.

Although FIG. 9 illustrates one example of a method 900 for efficient language model editing using a contextual prompt generator, various changes may be made to FIG. 9. For example, while shown as a series of steps, various steps in FIG. 9 could overlap, occur in parallel, occur in a different order, or occur any number of times (including zero times).

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
   receiving an input for a pre-trained large language model (LLM) from a user;
   generating one or more token embeddings based on the input;
   generating one or more prompt embeddings based on the input using a contextual prompt generator (CPG), the one or more prompt embeddings representing new or updated information that is not contained in existing knowledge of the LLM, the CPG including a neural network trained using a set of training edit embeddings representing training edit descriptors, wherein at least one of the training edit descriptors includes the new or updated information that is not contained in the existing knowledge of the LLM;
   providing the one or more token embeddings and the one or more prompt embeddings to the LLM; and
   outputting a prediction based on the one or more token embeddings and the one or more prompt embeddings using the LLM, wherein the prediction reflects the new or updated information represented by the one or more prompt embeddings;
   wherein generating the one or more prompt embeddings comprises:
      obtaining a set of edit embeddings representing edit descriptors, wherein the edit descriptors include the new or updated information;
      selecting an edit embedding from the set of edit embeddings that is most similar to the input;
      determining a likelihood of the selected edit embedding being relevant to the input; and
      responsive to the likelihood meeting or exceeding a threshold, generating the one or more prompt embeddings based on the selected edit embedding.

2. The method of claim 1, wherein the set of edit embeddings is generated by an edit encoder of the CPG and stored in a memory after being generated by the CPG.

3. The method of claim 2, wherein:
   each edit descriptor includes a question and an answer corresponding to the question; and
   the answer of each edit descriptor is different than a corresponding answer in the existing knowledge of the LLM for the same question.

4. The method of claim 1, wherein the edit embedding that is most similar to the input is selected using cross attention.

5. The method of claim 1, further comprising:
   before receiving the input for the LLM from the user, editing the CPG in a user editing mode;

wherein editing the CPG comprises:
    receiving one or more editing inputs; and
    updating an encoder of the CPG based on the one or
        more editing inputs.
6. An electronic device comprising:
    at least one processing device configured to:
        receive an input for a pre-trained large language model
            (LLM) from a user;
        generate one or more token embeddings based on the
            input;
        generate one or more prompt embeddings based on the
            input using a contextual prompt generator (CPG), the
            one or more prompt embeddings representing new or
            updated information that is not contained in existing
            knowledge of the LLM, the CPG including a neural
            network trained using a set of training edit embed-
            dings representing training edit descriptors, wherein
            at least one of the training edit descriptors includes
            the new or updated information that is not contained
            in the existing knowledge of the LLM;
        provide the one or more token embeddings and the one
            or more prompt embeddings to the LLM; and
        output a prediction based on the one or more token
            embeddings and the one or more prompt embeddings
            using the LLM, wherein the prediction reflects the
            new or updated information represented by the one
            or more prompt embeddings;
    wherein, to generate the one or more prompt embeddings,
        the at least one processing device is configured to:
        obtain a set of edit embeddings representing edit
            descriptors, wherein the edit descriptors include the
            new or updated information;
        select an edit embedding from the set of edit embed-
            dings that is most similar to the input;
        determine a likelihood of the selected edit embedding
            being relevant to the input; and
        responsive to the likelihood meeting or exceeding a
            threshold, generate the one or more prompt embed-
            dings based on the selected edit embedding.
7. The electronic device of claim 6, wherein the at least
one processing device is configured to:
    use an edit encoder of the CPG to generate the set of edit
        embeddings; and
    store the set of edit embeddings in a memory after the set
        of edit embeddings is generated.
8. The electronic device of claim 7, wherein:
    each edit descriptor includes a question and an answer
        corresponding to the question; and
    the answer of each edit descriptor is different than a
        corresponding answer in the existing knowledge of the
        LLM for the same question.
9. The electronic device of claim 6, wherein the at least
one processing device is configured to use cross attention to
select the edit embedding that is most similar to the input.
10. The electronic device of claim 6, wherein:
    the at least one processing device is further configured,
        before receiving the input for the LLM from the user,
        to edit the CPG in a user editing mode; and
    to edit the CPG, the at least one processing device is
        configured to:
        receive one or more editing inputs; and
        update an encoder of the CPG based on the one or more
            editing inputs.
11. A non-transitory machine-readable medium contain-
ing instructions that when executed cause at least one
processor of an electronic device to:

receive an input for a pre-trained large language model
        (LLM) from a user;
    generate one or more token embeddings based on the
        input;
    generate one or more prompt embeddings based on the
        input using a contextual prompt generator (CPG), the
        one or more prompt embeddings representing new or
        updated information that is not contained in existing
        knowledge of the LLM, the CPG including a neural
        network trained using a set of training edit embeddings
        representing training edit descriptors, wherein at least
        one of the training edit descriptors includes the new or
        updated information that is not contained in the existing
        knowledge of the LLM;
    provide the one or more token embeddings and the one or
        more prompt embeddings to the LLM; and
    output a prediction based on the one or more token
        embeddings and the one or more prompt embeddings
        using the LLM, wherein the prediction reflects the new
        or updated information represented by the one or more
        prompt embeddings;
    wherein the instructions that when executed cause the at
        least one processor to generate the one or more prompt
        embeddings comprise instructions that when executed
        cause the at least one processor to:
        obtain a set of edit embeddings representing edit
            descriptors, wherein the edit descriptors include the
            new or updated information;
        select an edit embedding from the set of edit embed-
            dings that is most similar to the input;
        determine a likelihood of the selected edit embedding
            being relevant to the input; and
        responsive to the likelihood meeting or exceeding a
            threshold, generate the one or more prompt embed-
            dings based on the selected edit embedding.
12. The non-transitory machine-readable medium of
claim 11, further containing instructions that when executed
cause the at least one processor to:
    use an edit encoder of the CPG to generate the set of edit
        embeddings; and
    store the set of edit embeddings in a memory after the set
        of edit embeddings is generated.
13. The non-transitory machine-readable medium of
claim 12, wherein:
    each edit descriptor includes a question and an answer
        corresponding to the question; and
    the answer of each edit descriptor is different than a
        corresponding answer in the existing knowledge of the
        LLM for the same question.
14. The non-transitory machine-readable medium of
claim 11, wherein the instructions when executed cause the
at least one processor to use cross attention to select the edit
embedding that is most similar to the input.
15. The method of claim 1, wherein, during training of the
CPG, parameters of the CPG are updated and parameters of
the LLM remain static.
16. The electronic device of claim 6, wherein, during
training of the CPG, parameters of the CPG are updated and
parameters of the LLM remain static.
17. The non-transitory machine-readable medium of
claim 11, wherein, during training of the CPG, parameters of
the CPG are updated and parameters of the LLM remain
static.
18. The method of claim 1, wherein the one or more
prompt embeddings are concatenated with the one or more
token embeddings as a prefix or suffix.

19. The electronic device of claim 6, wherein the at least one processing device is configured to concatenate the one or more prompt embeddings with the one or more token embeddings as a prefix or suffix.

20. The non-transitory machine-readable medium of claim 11, wherein the instructions when executed cause the at least one processor to concatenate the one or more prompt embeddings with the one or more token embeddings as a prefix or suffix.

* * * * *